United States Patent
Schuetze et al.

(10) Patent No.: US 7,389,306 B2
(45) Date of Patent: Jun. 17, 2008

(54) SYSTEM AND METHOD FOR PROCESSING SEMI-STRUCTURED BUSINESS DATA USING SELECTED TEMPLATE DESIGNS

(75) Inventors: Hinrich H. Schuetze, San Francisco, CA (US); Chia-Hao Yu, Davis, CA (US); Omer Emre Velipasaoglu, San Francisco, CA (US); Stan Stukov, Hillsborough, CA (US)

(73) Assignee: ENKATA Technologies, Inc., San Mateo, CA (US)

( * ) Notice: Subject to any disclaimer, the term of this patent is extended or adjusted under 35 U.S.C. 154(b) by 452 days.

(21) Appl. No.: 10/895,624

(22) Filed: Jul. 20, 2004

(65) Prior Publication Data

US 2005/0065967 A1 Mar. 24, 2005

Related U.S. Application Data

(60) Provisional application No. 60/490,219, filed on Jul. 25, 2003.

(51) Int. Cl.
*G06F 17/00* (2006.01)
(52) U.S. Cl. .................. 707/104.1; 707/101; 707/102; 707/103 R
(58) Field of Classification Search .............. 707/1–10, 707/100–104.1, 200–206
See application file for complete search history.

(56) References Cited

U.S. PATENT DOCUMENTS 6,912,555 B2 * 6/2005 Lemon et al. ............... 715/513

OTHER PUBLICATIONS

Cohn et al., Active learning with statistical models. Journal of Artificial Intelligence Research, 4, pp. 129-145, 1996.
Evans et al., Methods for approximating Integrals in Statistics with Special Emphasis on Bayesian Integration Problems. Statistical Science 10(3), pp. 254-272.
Fukunaga, K., Introduction to Statistical Pattern Recognition, 2nd Ed. Academic Press, 1990, pp. 254-300.
Joachims, T.. A statistical learning model of text classification for support vector machines. AC-SIGIR 2001.
Lewis et al., A sequential algorithm for training text classifiers. Proceedings of the Seventeenth Annual International ACM-SIGIR Conference on Research and Development in Information Retrieval. pp. 3-12, 1994.
Roy et al., Toward optimal active learning through sampling estimation of error reduction. Proceedings of the Eighteenth International Conference on Machine Learning, 2001.

(Continued)

*Primary Examiner*—Isaac Woo
(74) *Attorney, Agent, or Firm*—Townsend and Townsend and Crew LLP

(57) ABSTRACT

A method for processing semi-structured data. The method includes receiving semi-structured data into a first format from a real business process. Preferably, the semi-structured data are machine generated. The method includes tokenizing the semi-structured data into a second format and storing the semi-structured data in the second format into one or more memories and clustering the tokenized data to form a plurality of clusters. The method also includes identifying a selected low frequency term in each of the clusters, and processing at least two of the clusters and the associated selected low frequency terms to form a single template for the at least two of the clusters. In a preferred embodiment, the method replaces the selected low frequency term with a wild card character.

29 Claims, 6 Drawing Sheets

OTHER PUBLICATIONS

Seung et al., Query by committee. Proceedings of the Fifth Annual ACM Workshop on Computational Learning Theory, pp. 287-294, 1992.

Tong et al., Support vector machine active learning with applications to text classification. Proceedings of the Seventeenth International Conference on Machine Learning, 2000.

* cited by examiner

SYSTEM AND METHOD FOR PROCESSING SEMI-STRUCTURED BUSINESS DATA USING SELECTED TEMPLATE DESIGNS

CROSS REFERENCE TO RELATED APPLICATIONS

This application claims priority to U.S. Provisional Application No. 60/490,219 entitled "SYSTEM AND METHOD FOR EFFICIENT ENRICHMENT OF BUSINESS DATA", and filed on Jul. 25, 2003, and incorporated herein by reference. This application is also related to U.S. Ser. Nos. 10/890,018 and 10/891,892 filed respectively on Jul. 12, 2004 and Jul. 14, 2004), which are also incorporated by reference herein, and each of which claims priority to U.S. Provisional Application No. 60/490,219 entitled "SYSTEM AND METHOD FOR EFFICIENT ENRICHMENT OF BUSINESS DATA", and filed on Jul. 25, 2003.

BACKGROUND OF THE INVENTION

The present invention relates generally to supporting business decisions through data analysis by way of enriching data through data mining, text mining, and automatic classification. More particularly, the invention provides a method and system for 1) automatic detection of change in the business processes to be analyzed; 2) accurate measurement of the performance of automatic classification of business process data; 3) automatic handling of semi-structured text in business process analysis; and 4) efficient and maintainable scripting of the data enrichment process. Business decisions generally require knowledge about properties of business entities related to the decision. Such properties can be inferred by an automatic classifier that processes data associated with the entity. Parts of the data may be human-generated or free form text. Other parts of the data may be machine-generated or semi-structured. It is beneficial to analyze both free form text and semi-structured text data for business process analysis. While the enrichment process can be programmed in a number of existing programming languages and data base query languages, it is advantageous to provide a specialized language for increased maintainability and faster development of the enrichment process. By way of example for the enabling features of such a language, we describe SQXML, a language developed by Enkata Technologies, Inc. for this purpose. The business decision can relate to marketing, sales, procurement, operations, or any other business area that generates and captures real data in electronic form. Merely by way of example, the invention is applied to processing data from a call center of a large wireless telecommunication service provider. But it would be recognized that the invention has a much wider range of applicability. For example, the invention can be applied to other operational and non-operational business areas such as manufacturing, financial services, insurance services, high technology, retail, consumer products, and the like.

Common goals of almost every business are to increase profits and improve operations. Profits are generally derived from revenues less costs. Operations include manufacturing, sales, service, and other features of the business. Companies invest considerable time and effort to control costs to improve profits and operations. Many such companies rely upon feedback from a customer or detailed analysis of company finances and/or operations. Most particularly, companies collect all types of information in the form of data. Such information includes customer feedback, financial data, reliability information, product performance data, employee performance data, and customer data.

With the proliferation of computers and databases, companies have seen an explosion in the amount of information or data collected. Using telephone call centers as an example, there are literally over one hundred million customer calls received each day in the United States. Such calls are often categorized and then stored for analysis. Large quantities of data are often collected. Unfortunately, conventional techniques for analyzing such information are often time consuming and not efficient. That is, such techniques are often manual and require much effort.

Accordingly, companies are often unable to identify certain business improvement opportunities. Much of the raw data including voice and free-form text data are in unstructured form thereby rendering the data almost unusable to traditional analytical software tools. Moreover, companies must often manually build and apply relevancy scoring models to identify improvement opportunities and associate raw data with financial models of the business to quantify size of these opportunities. An identification of granular improvement opportunities would often require the identification of complex multi-dimensional patterns in the raw data that is difficult to do manually.

Examples of these techniques include statistical modeling, support vector machines, and others. These modeling techniques have had some success. Unfortunately, certain limitations still exist. That is, statistical classifiers must often be established to carry out these techniques. Such statistical classifiers often become inaccurate over time and must be reformed. Conventional techniques for reforming statistical classifiers are often cumbersome and difficult to perform. Although these techniques have had certain success, there are many limitations.

From the above, it is seen that techniques for processing information are highly desired.

BRIEF SUMMARY OF THE INVENTION

According to the present invention, techniques related to processing data are provided. More particularly, the invention provides a method and system for processing semi-structured data using selected template designs. Merely by way of example, the method has been applied to data in a call center. But it would be appreciated that the invention has a much broader range of applicability.

In summary, the analysis of semi-structured text has the following motivation according to specific embodiments.

Structured (or relational) data embedded in semi-structured data is extracted and put to optimal use.

Relational classes such as named entities, product type, customer service representative, time, location, address etc are identified and can be utilized by all subsequent steps of business process analysis.

Statistical classification of semi-structured data is facilitated by the analysis described here.

According to a specific embodiment, the same process we use for classification of free form text we could also use for semi-structured data. However, this will result in poor classification results in general because the same word has a different meaning when used in free form text versus when used as a fixed word in a template versus when used as a variable word in a template. Applying classification to templates after template identification will result in significantly more useful classification output. The automation of template identification as described in this invention has the advantage of significant cost savings as compared to manual analysis.

In a specific embodiment, the present invention provides a method for processing semi-structured records for making computer based business decisions. The method includes receiving a set of semi-structured records from a real business process, each of the records being in a first format and storing the set of semi-structured records in the first format into one or more memories. The method also includes tokenizing the set of semi-structured records into one or more strings of token elements, clustering the one or more strings of token elements associated with the set of semi-structured records into a plurality of clusters, and identifying one or more low frequency tokens in at least one of the records in the plurality of clusters. Preferably, the method replaces at least one of the low-frequency tokens with a predetermined wildcard character in at least one of the records to convert the semi-structured records in the first format into a second format and stores the set of semi-structured records in the second format into one or more memories. The method selects one or more of the semi-structured records in the second format and outputs the selected one or more set of semi-structured records in the second format. The method includes associating at least one of the semi-structured records in the first format with a respective semi-structured record in the second format and identifying a fixed component and a variable component in at least one of semi-structured records in the first format. The method includes determining one or more patterns associated with the identified fixed component and variable component, and displaying at least one of the patterns. Preferably, a user views the pattern and makes a decision based upon it according to a specific embodiment.

In an alternative specific embodiment, the invention provides a method for processing semi-structured data. The method includes receiving a set of semi-structured records into a first format from a real business process. Preferably, the semi-structured records are machine generated. The method includes tokenizing the set of semi-structured records into a second format and storing the semi-structured records in the second format into one or more memories. The method includes clustering one or more of the tokenized semi-structured records to form a plurality of clusters. The method also includes identifying at least one selected low frequency term in at least one of the clusters, and processing at least two of the records within the clusters and associated selected low frequency terms to form at least two records in the second format. The method also includes processing the two records in the second format to form a single template for the at least two of the records. In a preferred embodiment, the method replaces the selected low frequency term with a wild card character.

In yet an alternative specific embodiment, the present invention provides a computer based system for processing semi-structured data. The system comprises one or more memories that includes various computer codes to carryout at least certain functionality described herein. One or more codes are directed to receiving semi-structured data into a first format from a real business process. One or more codes are directed to tokenizing the semi-structured data into a second format and storing the semi-structured data in the second format into one or more memories. One or more codes are directed to clustering the tokenized data to form a plurality of clusters. One or more codes are directed to identifying at least one selected low frequency term in at least one of the clusters. One or more codes are directed to processing at least two of the clusters and associated selected low frequency terms to form at least two records in the second format, and processing the at least two records in the second format to form a single template for the at least two records. Depending upon the embodiment, other codes can also exist or replace any of the above codes.

In yet another alternative specific embodiment, the present invention provides a computer based system for processing semi-structured records for making computer based business decisions. Preferably, the system comprises one or more memories that includes various computer codes. One or more codes are directed to receiving a set of semi-structured records from a real business process. One or more codes are directed to storing the set of semi-structured records in the first format into the one or more memories. One or more codes are directed to tokenizing the set of semi-structured records into one or more strings of token elements. One or more codes are directed to clustering the one or more strings of token elements associated with the set of semi-structured records into a plurality of clusters. One or more codes are directed to identifying one or more low frequency tokens in at least one of the clusters in the plurality of clusters. One or more codes are directed to replacing at least one of the low-frequency tokens with a predetermined wildcard character in at least one of the clusters to convert the semi-structured records in the first format into a second format. One or more codes are directed to storing the set of semi-structured records in the second format into one or more memories. One or more codes are directed to selecting one or more of the semi-structured records in the second format. One or more codes are directed to outputting the selected one or more set of semi-structured records in the second format. One or more codes are directed to associating at least one of the semi-structured records in the first format with a respective semi-structured record in the second format. One or more codes are directed to identifying a fixed component and a variable component in each of the semi-structured records in the first format. One or more codes are directed to determining one or more patterns associated with the identified fixed component and variable component and one or more codes directed to displaying at least one of the patterns.

Many benefits are achieved by way of the present invention over conventional techniques. For example, the present technique provides an easy to use process that relies upon conventional technology. In some embodiments, the method provides for improved analysis of semi-structured data using selected template designs. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques related to processing data are provided. More particularly, the invention provides a method and system for processing semi-structured data using selected template designs. Merely by way of example, the method has been applied to data in a call center. But it would be appreciated that the invention has a much broader range of applicability.

Figure 1:
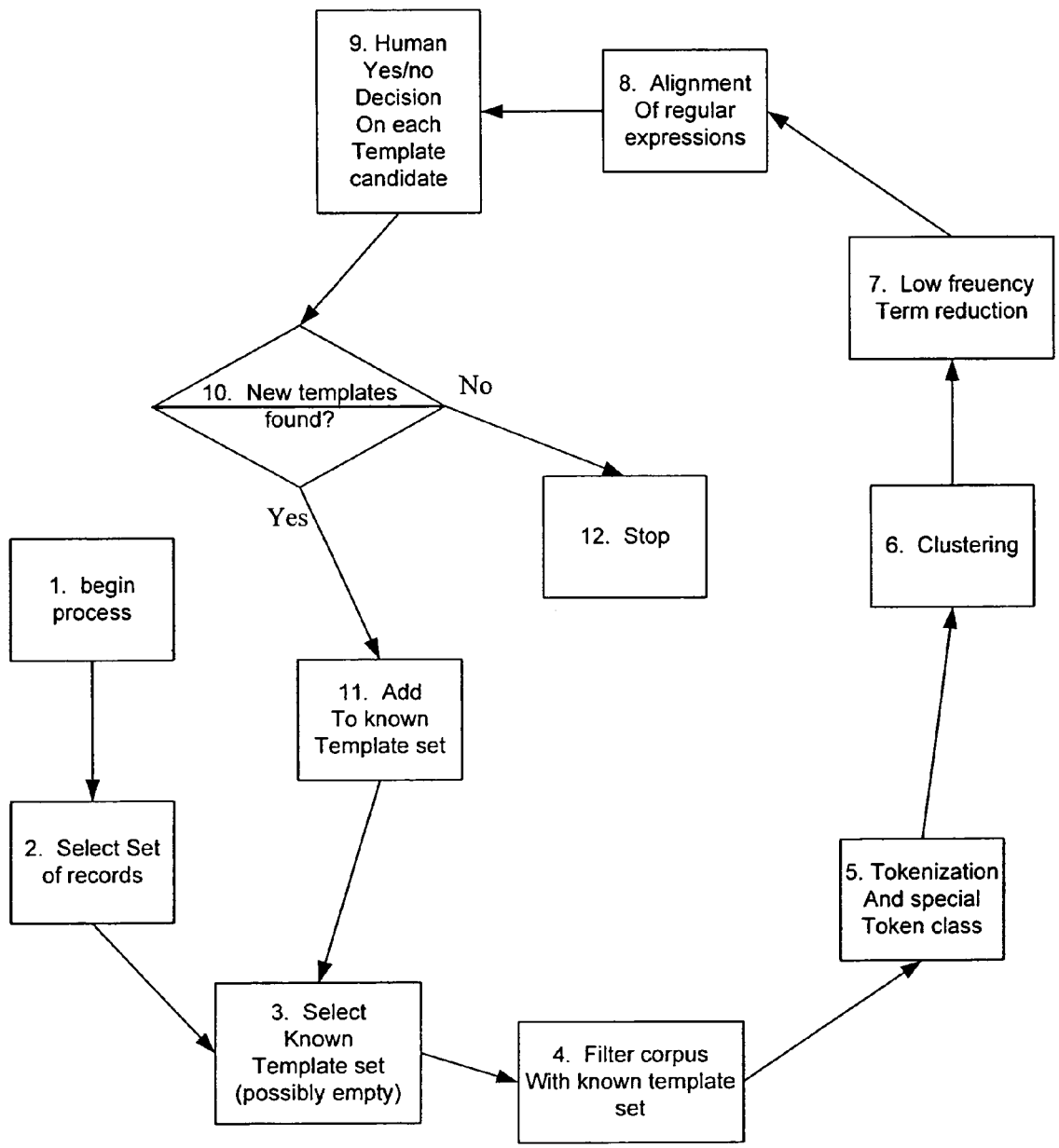
FIG. 1 is a simplified flow diagram for a subsystem that processes semi-structured data according to an embodiment of the present invention.

Referring to FIG. 1, a method for processing semi-structured data according to an embodiment of the present invention may be outlined below.

1. Begin process (step 1);
2. Provide a set of records comprising semi-structured data in a first format (step 2);
3. Select zero or more templates (step 3)
4. Filter corpus with the zero or more templates (step 4);
5. Tokenize the semi-structured data to a second format (step 5);
6. Cluster the tokenized data (step 6);
7. Perform a low frequency reduction on the clustered data (step 7);
8. Align selected regular expressions in the clustered data (step 8);
9. Perform post processing of aligned and clustered data (step 9);
10. Determine whether new templates were found or not found (step 10);
11. Stop, if no new templates have been identified (step 12);
12. Alternatively, add to template set (step 11);
13. Return to step 3; and
14. Perform other steps, as desired.

The above sequence of steps provides a method according to an embodiment of the present invention. As shown, the method uses a combination of steps including a way of processing semi-structured data using template designs according to an embodiment of the present invention. Of course, other alternatives can also be provided where steps are added, one or more steps are removed, or one or more steps are provided in a different sequence without departing from the scope of the claims herein. Further details of the present method can be found throughout the present specification and more particularly below.

Automatic Processing of Semi-Structured Text

The part of the invention described in this section provides a method and system for processing semi-structured data derived from a real process and relating such data to a business decision. During the analysis of collections of free form text from enterprise repositories, there often is a mixture of human entered documents and machine-generated documents. These machine-generated documents often contain variable information such as account number, customer address, owed amount, account balance, etc.

Following are some examples of such machine-generated documents.

ACCT NBR=24302434, BALANCE=$243.34, PAID=$48.34, METHOD=CREDIT CARD CUSTOMER UPDATE INFORMATION. FIELD=ADDRESS, PHONE NUMBER, EMAIL ORDER NUMBER=63453645, ACTION=CANCEL, CONFIRMATION NUMBER=354XBF2

These documents, once identified, can be processed quickly and accurately, and the information embedded in these documents, such as amount, payment method, and action, consists of valuable indicators of certain business events. The goal of our process is to identify these patterns accurately and with minimal human effort.

Following are the examples of regular expression patterns that can be automatically generated to parse the above examples. We call such regular expression patterns templates.

ACCT NBR=(.*), BALANCE=(.*), PAID=(.*), METHOD= (.*) CUSTOMER UPDATE INFORMATION. FIELD=(.*) ORDER NUMBER=(.*), ACTION=(.*), CONFIRMATION NUMBER=(.*)

We use the regular expression (.*) to represent a variable field in the templates. By reading a number of documents with the same pattern, it is intuitive to conclude what these variable fields are, and their corresponding sub-patterns. We start our discussion by describing a method that takes a collection of documents and constructs a set of templates from it. There are two key difficulties in template finding.

First, we want to find templates of the right level of generality. It is easy to find very general templates (e.g., *, which matches everything) and it is easy to find very specific templates (e.g., each document matches itself, but usually not any other records). But these very general and very specific templates do not capture the abstractions we need to support business process analysis.

Secondly, we need to be able to distinguish free form text from semi-structured text. If we knew that every document is semi-structured the task would be somewhat easier. But that is often not the case. So we need to be able to discriminate between free form text and semi-structured text as well as assign semi-structured documents to templates.

Implementation

By way of example, we describe one specific implementation of analyzing semi-structured data. It should be clear to one versed in the art that the various steps and procedures described here can be combined in ways different from this example and that some steps can be omitted in some cases.

Tokenization and Special Token Classes

Documents are first tokenized. We choose a set of delimiters, for example white space and special characters such as "!". We can also replace certain types of tokens such as dollar amounts by a special symbol to incorporate any desired requirements that all tokens of a certain type should be treated identically. Certain classes of tokens consisting of numbers and special characters can be found automatically by replacing all digits with the digit 0, and then searching for frequent combinations of digits and special characters such as 000-000-0000 for US telephone numbers or the following series of patterns for dollar amounts: $0.00, $00.00, $000.00, . . .

In general, we have found that an effective preprocessing step for template finding is to replace all digits with 0. This reduces variability that is usually not semantically relevant for distinguishing between different templates or between templates and free form text.

Delimiters can be found automatically. For example, one can run the algorithm with different delimiter sets and choose the delimiter set that gives best results. Or one can use a measure such as entropy to find natural breakpoints in the character stream. Good delimiters are those characters where the predictability of the next character falls off compared to the previous position.

Here is an example of tokenization:

OPEN DATE=Nov. 12, 2002 10:23.34 PM CURRENT BALANCE=$243.43 ACCT NBR=84029392

If the delimiters are dollar sign ($), equal sign (=), slash (/), colon (:), period (.) and white space ( ), then our tokens are:

"OPEN", " ", "DATE", " ", "=", " ", "00", "/", "00", "/", " ", "0000", " ", "00", ":", "00", ".", "00", " ", "PM", " ", "CURRENT", " ", "BALANCE", " ", "=", " ", "$", " ", "000", ".", "00", " ", "ACCT", " ", "NBR", " ", "=", " ", "00000000"

Since the representation of concepts such as date, account number, and zip code almost always has the same number format, the number analysis procedure automatically discovers them and encodes them.

As discussed below an alternative is to tokenize the documents into letter n-grams.

Clustering

The next step is to cluster documents. Any clustering algorithm can be used here. One example of a clustering algorithm that seems to work well is k-means, but hierarchical clustering algorithms and EM clustering algorithms are also appropriate.

When using k-means it is advantageous to do each iteration on a smaller sub sample of the document collection. So the procedure is: take a sample of the entire collection if desired. Then in each iteration take an even smaller sub sample and recomputed centroids based on that smaller sub sample. A different sub sample is used in each iteration. While this procedure may not be appropriate for complex clustering problems, we have found that this works very well for semi-structured text since we are only interested in frequent templates. Those are grouped well into clusters even if we draw smaller intermediate samples of, for example, size 20 k where k is the number of clusters.

Possible parameters in this step are: the number of desired clusters, the number of iterations if we use an iterative clustering procedure, the minimum number of documents per cluster, the maximum number of documents per cluster, and the size of the sample to be clustered.

We can use any desired distance metric or similarity measure for the clustering procedure. In our experience, using cosine similarity on term frequency inverse document frequency vectors works well.

Low Frequency Term Reduction

It is characteristic of templates that they have two types of words: fixed words and variable words. Fixed words by definition occur in every document that matches the template. Variable words vary from instantiation to instantiation and are represented by the wild card character * in the template. In order to discriminate these two types of words, we make the assumption that all documents belonging to a desired template are in the same cluster. Note that it is ok for several templates to share a cluster. So the assumed mapping from templates to clusters is many-to-one.

Since all members of a template are assumed to be in one cluster, the fixed words of that template will be frequent. In most cases, the variable words will not be frequent. The key idea of step 3 is to replace all infrequent words in a cluster by the wild card character and use the resulting strings as raw forms of templates.

The main parameter of this step is the threshold for qualifying as a fixed word. Values anywhere between 0.005 and 0.2 can be appropriate depending on the properties of the semi-structured text that is being analyzed.

As an example consider this cluster of 3 records
NAME=JACK, STATUS=ACTIVE
NAME=JANE, STATUS=ACTIVE
NAME=JOHN, STATUS=ACTIVE
This will be converted into this representation:
NAME=.*, STATUS=ACTIVE
NAME=.*, STATUS=ACTIVE
NAME=.*, STATUS=ACTIVE Alignment of Regular Expressions The goal of this step is to merge several templates that are too specific into one more general template. Given two templates, we can align the tokens using dynamic programming. If two clusters have similar templates that are too different to be merged into the same cluster automatically, the desired merge can be executed in this step. This case can occur for semi-structured data that have a large free form component. For example, a 10 word fixed pattern may be followed by a free form explanation that, on average, is 30 words long. The 30 word explanation may dominate the cluster assignment for the record.

In our experience, the best mode of doing this type of merging is dynamic programming, but other alignment algorithms are possible.

The parameters of this step are the score for token mismatch (the penalty for aligning two different tokens with each other), the score for token subsume (the penalty for aligning a wild card character with a non-wildcard), the score for wildcard-epsilon matches (the penalty for aligning a wild card character with no token in the other template), the score for token match (penalty for aligning identical tokens), the score for wildcard match (the penalty for aligning two wildcards), the minimum number of non-wildcard tokens (a template with few non-wildcards may be too general), the score for token extension (a penalty for aligning a long string of tokens in one template with the wildcard character in the other template), and a threshold for merging (two templates will be merged if alignment cost is below this threshold). Another possible parameter is the ratio between the length of the final expression to the length of the original expression (do not execute a merge if this ratio becomes too small).

Intuitively, the dynamic alignment score is a measure of how different two templates are, given the penalty costs noted above. To merge templates, we start from the first template and find the template with the lowest score below the merging threshold to merge. Alternatively, we can execute all merges that are below the specified threshold. Merging templates simply turns non-identical tokens into wildcards. If the merge result contains fewer than the minimum number of non-wildcard tokens, then we undo the merge. Once we have executed all possible mergers for the first template, we process the first remaining template and so on.

A second possible implementation of merging differs in that two different aligned tokens t1 and t2 are not converted into wildcards. Instead, they are replaced by a new special token {t1, t2}. This token matches both t1 and t2. This type of alignment (e.g., t1 with {t1, t2}) has a special penalty different from the ones mentioned above. This implementation is useful for finding classes such as: {am, pm}; product numbers; first names etc.

A third possible implementation of merging is to use regular expressions. For example, product codes may all have the form "00p00" where 0 can be any digit. At a point where we are considering merging two templates that only differ in one token which is "94p46" in one template and "99p12" in another template, it is preferable to create a regular expression "00p00" (where 0 matches any digit) rather than a wildcard to occupy the corresponding position in the template.

Regular expressions can also be constructed as a post-processing step. Consider the case that we ended up with a template with a wildcard in the position where product numbers occur. After detecting that all tokens that occur in this position in records matching the template are subsumed by the regular expression "00a00", we can improve the representation of the template by substituting "00a00" for the wildcard.

Human Post-Processing

After a set of template candidates are computed, these can be quality checked by a human operator. It is useful to display statistics next to each template that characterizes its effectiveness. Examples of such statistics include the number of records that match the template, the average percentage of each record that is matched by the template (that is, the proportion matched by wildcards versus by fixed words in the template), the overlap of the template with other templates (are most of the records matched by this template also matched by a more specific template etc).

We output the collection of templates along with a sample of the matching records for the expert to examine. The expert simply selects the regular expressions for inclusion that meet the desiderata of the specific business process analysis under consideration.

Once a set of templates has been completed, it can be applied to the document collection and all records not matched by any template can be selected for a second iteration of template analysis. Iteration ensures that any templates that were not found in a previous iteration can also be found.

Extensions

One problem in template detection is to distinguish content bearing words that are meaningful elements of semi-structured data from non-content words which occur so frequently that they may be mistaken for fixed words of templates. For example, in one template induction experiment we discovered a template of the form "* has been *". There are a number of ways to prevent non-content words from being misrecognized as fixed words of templates including stop lists, comparison of the documents to be analyzed with a general corpus of text and the performance of special processing for those words that are common in both text collections; and identification of non-content bearing words by their special syntactic and co-occurrence properties.

Once a first pass of template identification has been used to identify relational classes such as: am, pm; first names; last names; product names etc, we can then replace members of these relational classes with special symbols as discussed above and restart template identification on this rewritten corpus. The new corpus will be more amenable to template identification since many of the important generalizations have already been captured and will make identification of templates more reliable and more comprehensive.

The identification and processing of relational data make semi-structured data as valuable as relational data taken directly out of a relational database management system. For example, if the amount of a rebate for a customer is captured in semi-structured data, then this invention enables us to identify the template and extract the rebate amount out of all applicable records and then store it in a relational database with the corresponding customer. This information can then be used in conjunction with other relational data to optimize business processes such as the granting of rebates.

Relational data thus extracted can also be used as additional input for text classification.

Relational classes raise the problem of maintenance. A template with a variable corresponding to first name needs to be updated with additional first names that did not occur in the original data set, but do occur in temporally later runs of the business process analysis software. This should be straightforward to someone versed in the art given the techniques described here.

Semi-structured text is a mixture of fixed and variable components. In many cases, the detection and special processing of relational data as described above will extract all the available information out of the variable component. However, there are other cases where that is not the case. Consider a template that has several fixed and variable parts, with one fixed part being the word "reason for delinquency" followed by a free form explanation of the reason for delinquency. For some business process analysis, it may be advisable to classify this free form text.

One way of doing this is to introduce a special token that marks the record as being an instance of the template and to modify all variable tokens (e.g., by appending a special string) such that they can be distinguished from the same tokens occurring in other "slots" of the template or in other free form text environments. For example, the token unemployed would be transformed into different tokens "unemployed1", "unemployed2", "unemployed3" etc depending on whether it occurred in a free form text record, as the text following the fixed word "reason for delinquency" in the template mentioned above, following a different fixed word in the same template, or in a different template. A text classifier can then be trained to make a classification decision depending on these tokens without being confused by the fixed word tokens that were eliminated. Relational classes can be used as additional input to the classifier, possibly after the use of binning for numbers or regular expressions to arrive at a representation that is amenable to generalization.

The above sequence of steps provides a method according to an embodiment of the present invention. As shown, the method uses a combination of steps including a way of processing semi-structured data using selected template designs according to an embodiment of the present invention. Additionally, the headings used above are not intended to be limiting in any manner but has been provided for easy reading. Of course, other alternatives can also be provided where steps are added, one or more steps are removed, or one or more steps are provided in a different sequence without departing from the scope of the claims herein. Other methods according to the present invention are provided below.

A method for forming templates for processing semi-structured data according to an embodiment of the present invention may be outlined as follows:

1. Begin process (step 0);

2. Provide a set of semi-structured records for support of business decisions (step 1);
3. Input a set of semi-structured records in a first format from a real business process (step 2);
4. Store the semi-structured records in a first format into one or more memories (step 3);
5. Tokenize the semi-structured records into strings of tokens (step 4);
6. Cluster the semi-structured records into a number of clusters (step 5);
7. Identify a subset of tokens in each cluster as the low-frequency tokens of that cluster (step 6);
8. Convert the semi-structured records into a second format by replacing the low-frequency tokens with a special wildcard character (steps 6 and 7);
9. Store the records in the second format into one or more memories (step 8);
10. Align and merge records in the second format (optionally) (step 9);
11. Select one or more records in the second format (step 10);
12. Present the one or more records in the second format to a user for further processing (step 11);
13. Process the records in the first format by matching them with the records in the second format (after processing by the user) and separating them into fixed and variable components (step 12);
14. Determine one or more patterns associated with the identified components (step 13);
15. Display at least one of the patterns, and at least one of the business processes (step 14);
16. Perform other steps, as desired (step 15).

The above sequence of steps provides a method according to an embodiment of the present invention. As shown, the method uses a combination of steps including a way of processing semi-structured data using selected template designs according to an embodiment of the present invention. Of course, other alternatives can also be provided where steps are added, one or more steps are removed, or one or more steps are provided in a different sequence without departing from the scope of the claims herein. Certain details of the present method can be found throughout the present specification and more particularly below.

Figure 2:
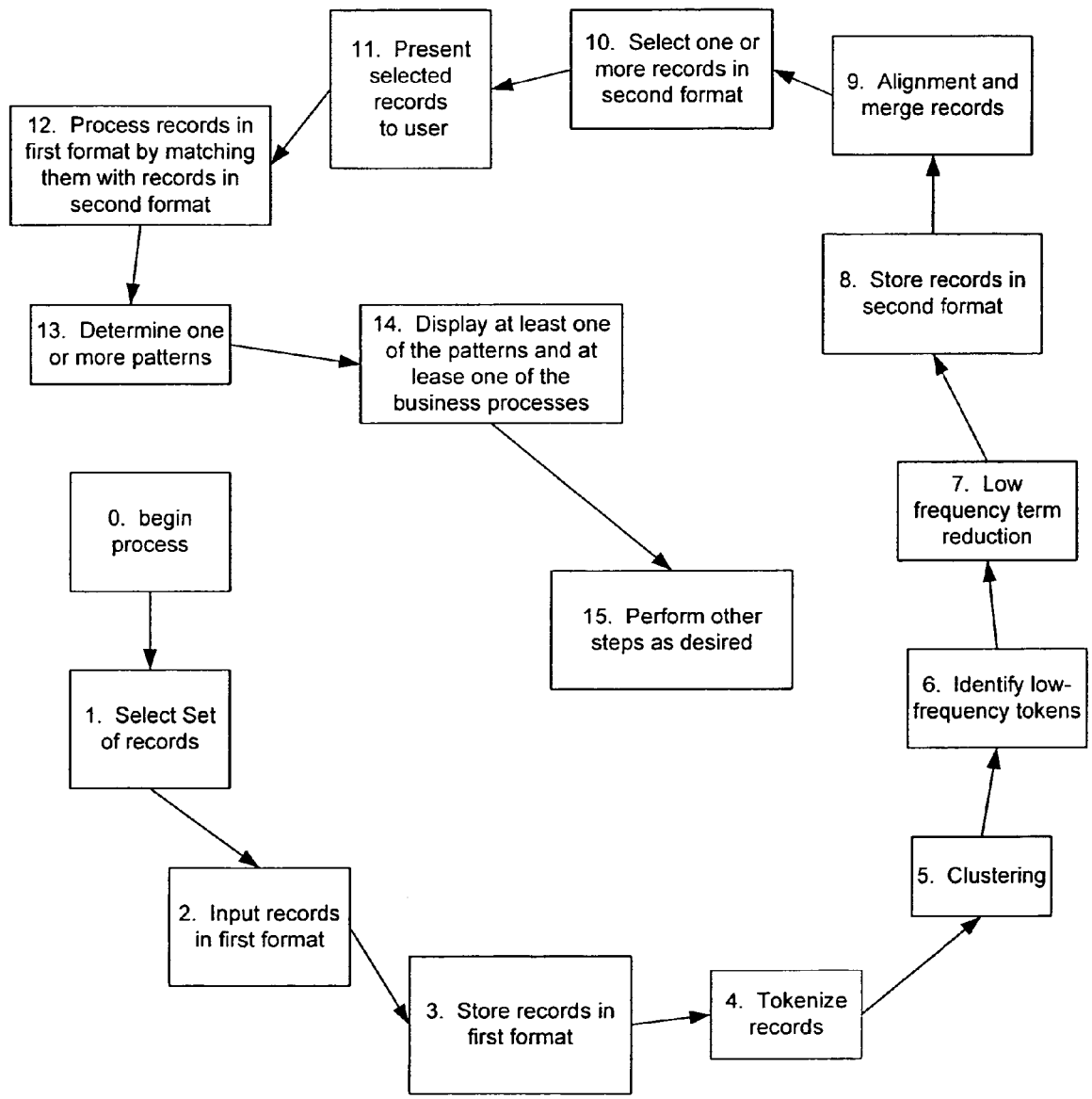
FIG. 2 is a simplified flow diagram of a method for forming one or more templates for semi-structured data processing according to an embodiment of the present invention.

FIG. 2 is a simplified flow diagram of a method for forming one or more templates for semi-structured data processing according to an embodiment of the present invention. This diagram is merely an illustration, and should not unduly limit the scope of the claims herein. One of ordinary skill in the art would recognize many variations, alternatives, and modifications As shown, the present method begins at start, step 0. Like steps are performed in this method as the previous method without unduly limiting the scope of the claims herein. Additionally, the present method also includes use of other examples of certain process steps, which can also be used for the previous method. As merely an example, templates can be formed using alternative techniques. For example, an alternative example of a template is provided below.

Financial transaction=.* Adjustment amount=.*,
Financial account number=.* Caption code=.*

.*, .* AM, ADJUSTMENT IN THE AMOUNT OF .* APPLIED TO ACCT .*
PLAN B DEF. PHONE (.*) RETURNED TO THE WAREHOUSE.
REFUND CHECK NUMBER .* ISSUED ON .* FOR .* ACCOUNT DISCONNECTED. COMMENTS: .*

Additionally, the present method also includes other examples of replacing low frequency tokens with wildcards according to embodiments of the present invention. As merely an illustration, various examples have been listed below.

EXAMPLE 1

Record 1:
PLAN B DEF. PHONE (.*) RETURNED TO THE WAREHOUSE.
Record 2:
PLAN B DEF. PHONE (123-456-7890) RETURNED TO THE WAREHOUSE.
Alignment:
PLAN-PLAN
B-B
DEF.-DEF.
PHONE-PHONE
(-(
wildcard - 123-456-7890
)-)
RETURNED-RETURNED
TO-TO
THE-THE
WAREHOUSE.-WAREHOUSE.
Merged pattern:
PLAN
B
DEF.
PHONE
(
wildcard
)
RETURNED
TO
THE
WAREHOUSE.

As merely an illustration, the above is an example of merging a wild card with a token. We simply use the more general pattern with the wildcard.

EXAMPLE 2

Record 1:
PLAN B DEF. PHONE (987-654-3210) RETURNED TO THE WAREHOUSE.
Record 2:
PLAN B DEF. PHONE (123-456-7890) RETURNED TO THE WAREHOUSE.
Alignment:
PLAN-PLAN
B-B
DEF.-DEF.
PHONE-PHONE
(-(
987-654-3210 - 123-456-7890
)-)
RETURNED-RETURNED
TO-TO
THE-THE
WAREHOUSE.-WAREHOUSE.
Merged pattern:
PLAN
B
DEF.
PHONE
(
wildcard
)
RETURNED -continued

```
TO
THE
WAREHOUSE.
```

As merely an illustration, the above is an example of two records that can be perfectly aligned except for one token. In this case the token that differs is replaced by a wildcard.

EXAMPLE 3

```
Record 1:
PLAN B DEF. PHONE (.*) RETURNED TO THE WAREHOUSE.
Record 2:
PLAN. * DEF. PHONE (123-456-7890) RETURNED TO THE
WAREHOUSE.
Alignment:
PLAN-PLAN
B-wildcard
DEF.-DEF.
PHONE-PHONE
(-(
wildcard - 123-456-7890
)-)
RETURNED-RETURNED
TO-TO
THE-THE
WAREHOUSE.-WAREHOUSE.
Merged pattern:
PLAN
wildcard
DEF.
PHONE
(
wildcard
)
RETURNED
TO
THE
WAREHOUSE.
```

As merely an illustration, the above example is similar to example 1 except that each record contributes a wildcard. The two records partly subsume each other and the merger is different from the two records.

The above sequence of steps provides a method according to an embodiment of the present invention. As shown, the method uses a combination of steps including a way of processing semi-structured data using selected template designs according to an embodiment of the present invention. Of course, other alternatives can also be provided where steps are added, one or more steps are removed, or one or more steps are provided in a different sequence without departing from the scope of the claims herein. Certain details of various systems can be used to implement the present invention can be found throughout the present specification and more particularly below.

Figure 3:
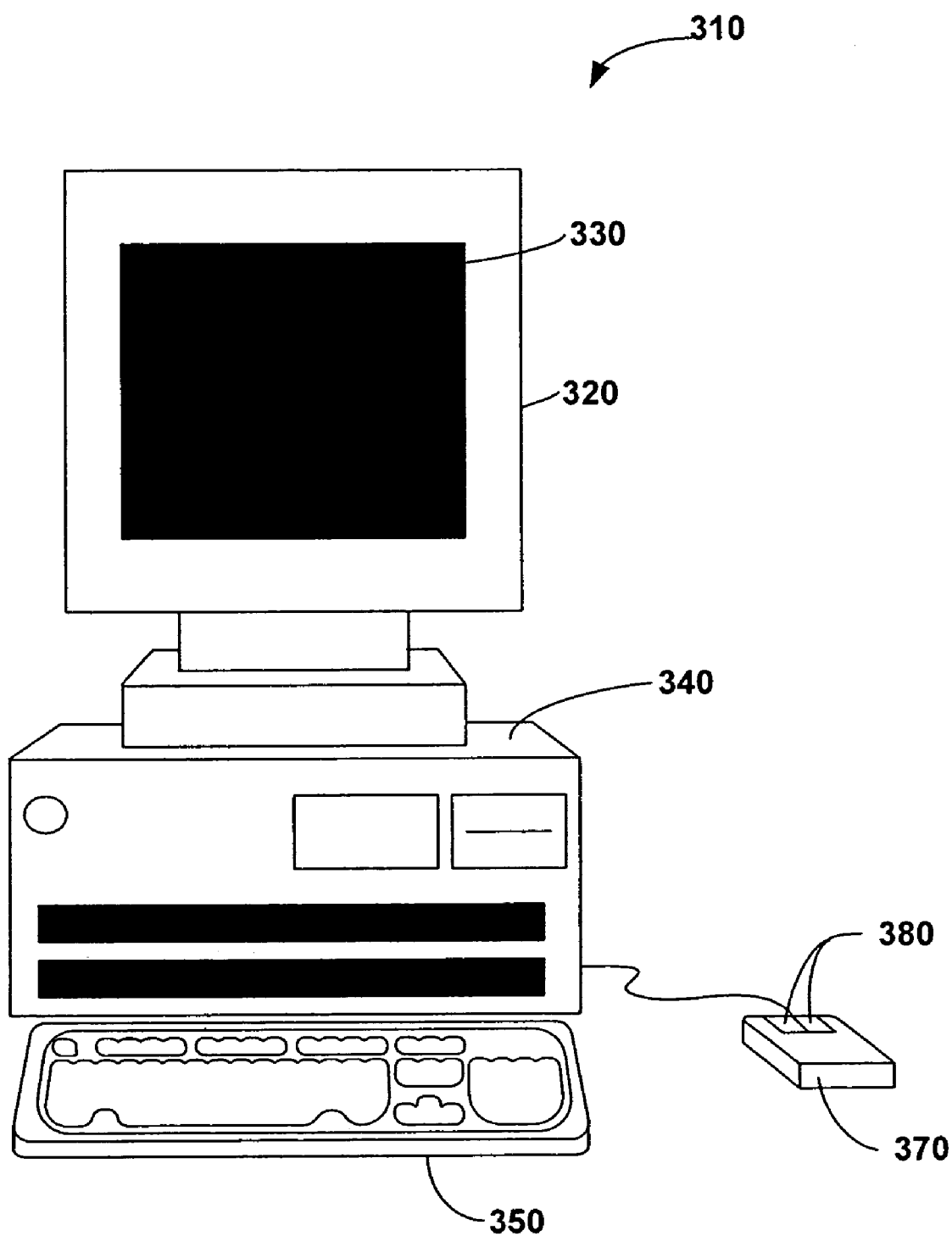
FIG. 3 is a simplified diagram of a computer system for processing semi-structured data according to an embodiment of the present invention.

Referring to FIG. 3, a computer system 310 for implementing the present method is provided. This system is merely an example, which should not unduly limit the scope of the claims herein. One of ordinary skill in the art would recognize many variations, alternatives, and modifications. Embodiments according to the present invention can be implemented in a single application program such as a browser, or can be implemented as multiple programs in a distributed computing environment, such as a workstation, personal computer or a remote terminal in a client server relationship. FIG. 3 shows computer system 310 including display device 320, display screen 330, cabinet 340, keyboard 350, scanner and mouse 370. Mouse 270 and keyboard 350 are representative "user input devices." Mouse 370 includes buttons 380 for selection of buttons on a graphical user interface device. Other examples of user input devices are a touch screen, light pen, track ball, data glove, microphone, and so forth. FIG. 3 is representative of but one type of system for embodying the present invention. It will be readily apparent to one of ordinary skill in the art that many system types and configurations are suitable for use in conjunction with the present invention. In a preferred embodiment, computer system 310 includes a Pentium™ class based computer by Intel Corporation, running Windows™ NT operating system by Microsoft Corporation, but can also be others depending upon the application. However, the apparatus is easily adapted to other operating systems and architectures by those of ordinary skill in the art without departing from the scope of the present invention.

As noted, mouse 370 can have one or more buttons such as buttons 380. Cabinet 340 houses familiar computer components such as disk drives, a processor, storage device, etc. Storage devices include, but are not limited to, disk drives, magnetic tape, solid state memory, bubble memory, etc. Cabinet 340 can include additional hardware such as input/output (I/O) interface cards for connecting computer system 310 to external devices external storage, other computers or additional peripherals, which are further described below.

Figure 4:
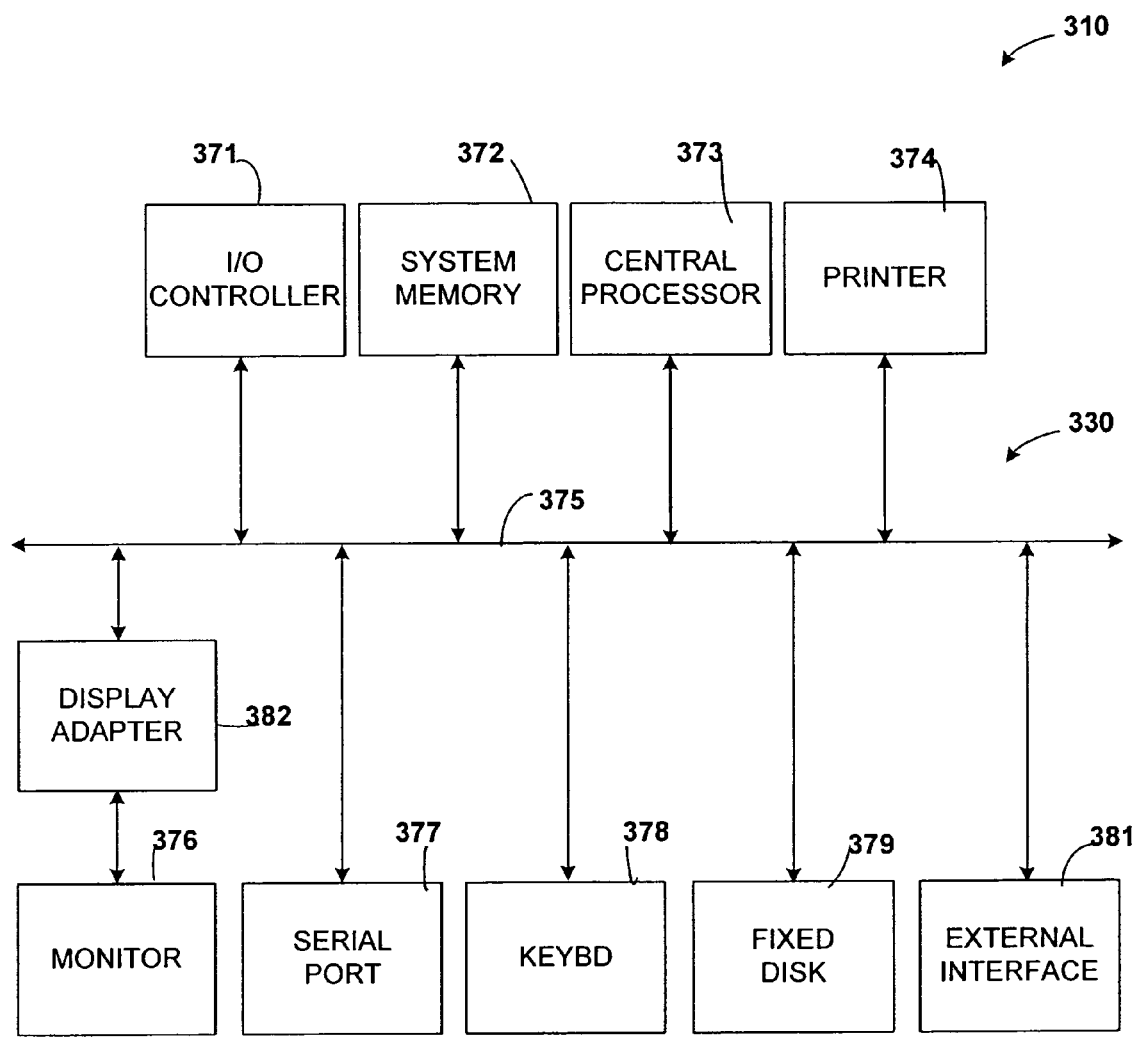
FIG. 4 is a more detailed diagram of a computer system for processing semi-structured data according to an embodiment of the present invention.

FIG. 4 is an illustration of basic hardware subsystems in computer system 310. This diagram is merely an illustration and should not limit the scope of the claims herein. One of ordinary skill in the art will recognize other variations, modifications, and alternatives. In certain embodiments, the subsystems are interconnected via a system bus 375. Additional subsystems such as a printer 374, keyboard 378, fixed disk 379, monitor 376, which is coupled to display adapter 382, and others are shown. Peripherals and input/output (I/O) devices, which couple to I/O controller 371, can be connected to the computer system by any number of means known in the art, such as serial port 377. For example, serial port 377 can be used to connect the computer system to a modem 381, which in turn connects to a wide area network such as the Internet, a mouse input device, or a scanner. The interconnection via system bus allows central processor 373 to communicate with each subsystem and to control the execution of instructions from system memory 372 or the fixed disk 379, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMs and bar codes, and semiconductor memories such as flash memory, read-only-memories (ROM), and battery backed memory. Embodiments of methods that can be implemented using the present system are provided in more detail below. Depending upon the embodiment, the present invention can be implemented, at least in part, using such computer system. In a preferred embodiment, computer codes can be used to carry out the functionality described herein using the present computer system. Of course, there can be other variations, modifications, and alternatives.

Figure 5:
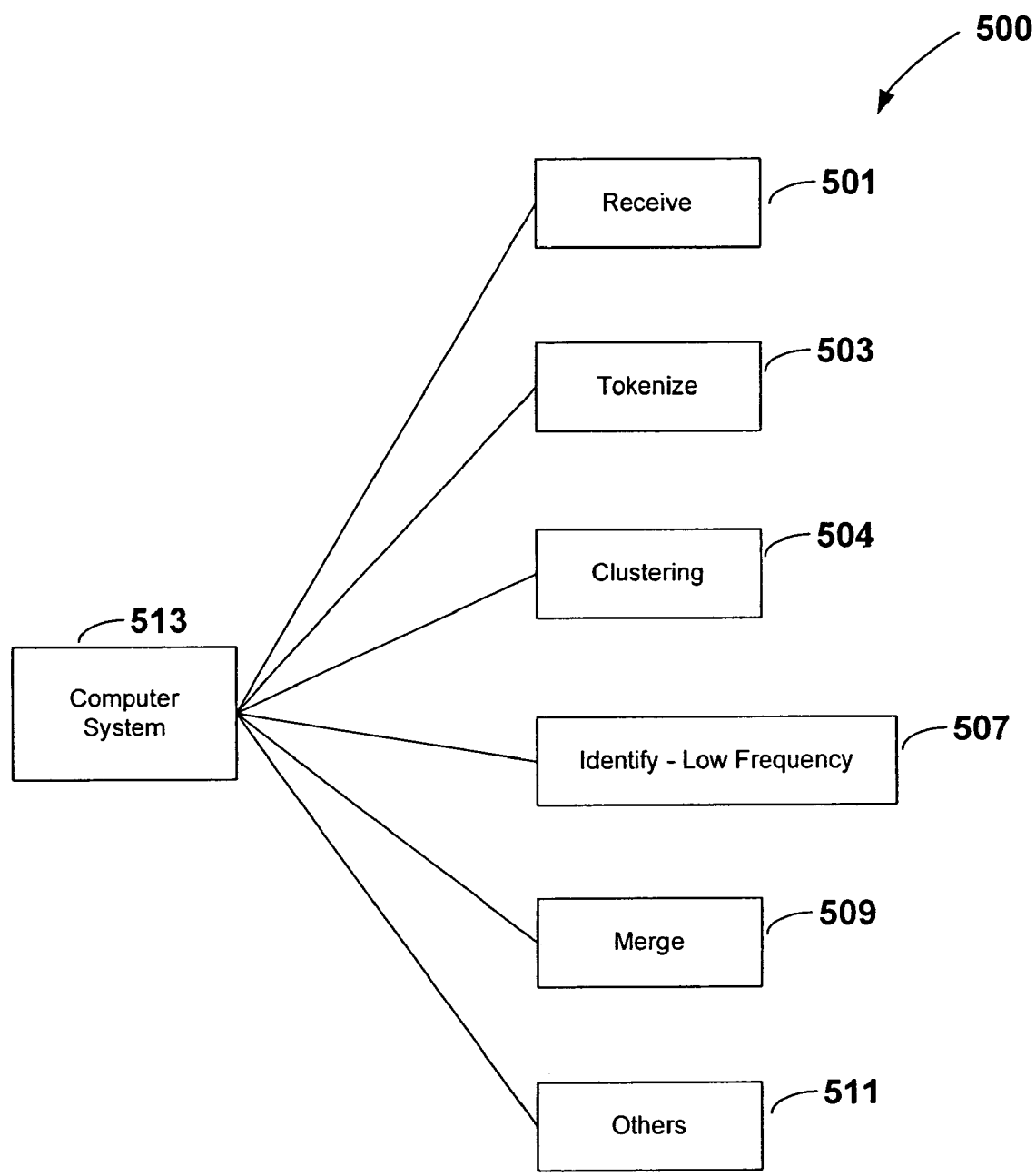
FIG. 5 is a simplified block diagram of computer modules for processing semi-structured data according to an embodiment of the present invention.

FIG. 5 is a simplified block diagram of computer modules for processing semi-structured data according to an embodiment of the present invention. This diagram is merely an example, which should not unduly limit the scope of the claims herein. One of ordinary skill in the art would recognize many variations, modifications, and alternatives. As shown, the block diagram includes a computer based system 513 for processing semi-structured data. The system comprises one or more memories that includes various computer codes to carryout at least certain functionality described herein. One or more codes are directed to receiving 501 semi-structured data into a first format from a real business process. One or more codes are directed to tokenizing 503 the semi-structured data into a second format and storing the semi-structured data in the second format into one or more memories.

One or more codes are to directed to clustering 504 the tokenized data to form a plurality of clusters. One or more codes are directed to identifying 507 a selected low frequency term in each of the clusters and/or at least one of the clusters. Preferably, the low frequency term is selected in a record in one of the clusters according to a specific embodiment. One or more codes are directed to processing 509 at least one of the clusters and the associated selected low frequency terms to form at least two records in the second format. One or more codes are also directed to processing the at least two records in the second format to form a single template for the at least two records. Depending upon the embodiment, other codes and methods 511 can also exist or replace any of the above codes. That is, the functionality described herein can be provided by other forms of computer code that may be stored in one or more memories according to a specific embodiment.

The above computer codes carry out a method according to an embodiment of the present invention. As shown, the codes may include a combination of codes including a way of processing semi-structured data using selected template designs according to an embodiment of the present invention. Of course, other alternatives can also be provided where codes are added, one or more codes are removed, or one or more codes are provided in a different sequence without departing from the scope of the claims herein. Of course, one of ordinary skill in the art would recognize other variations, modifications, and alternatives.

Figure 6:
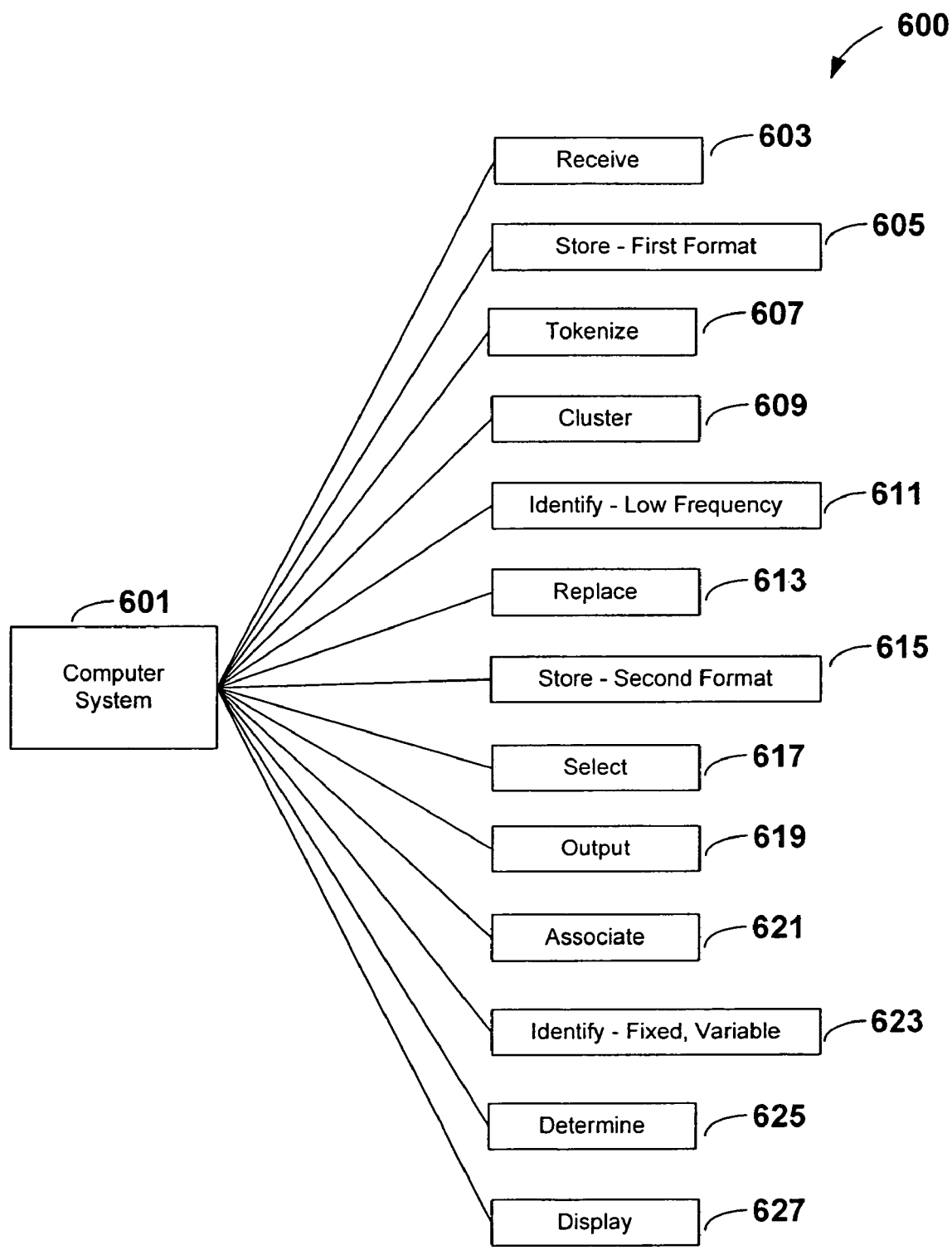
FIG. 6 is a simplified block diagram of computer modules for processing semi-structured data according to an alternative embodiment of the present invention.

FIG. 6 is a simplified block diagram 600 of computer modules for processing semi-structured data according to an alternative embodiment of the present invention. This diagram is merely an example, which should not unduly limit the scope of the claims herein. One of ordinary skill in the art would recognize many variations, modifications, and alternatives. As shown, the present invention provides a computer based system 601 for processing semi-structured records for making computer based business decisions. Preferably, the system comprises one or more memories that includes various computer codes. One or more codes are directed to receiving 603 a set of semi-structured records from a real business process. One or more codes are directed to storing 605 the set of semi-structured records in the first format into the one or more memories. One or more codes are directed to tokenizing 607 the set of semi-structured records into one or more strings of token elements. One or more codes are directed to clustering 609 the one or more strings of token elements associated with the set of semi-structured records into a plurality of clusters. One or more codes are directed to identifying 611 one or more low frequency tokens in each of the clusters in the plurality of clusters and/or at least one of the clusters.

In a preferred embodiment, one or more codes are directed to replacing 613 at least one of the low-frequency tokens with a predetermined wildcard character in at least one of the clusters to convert the semi-structured records in the first format into a second format. One or more codes are directed to storing 615 the set of semi-structured records in the second format into one or more memories. One or more codes are directed to selecting 617 one or more of the semi-structured records in the second format. One or more codes are directed to outputting 619 the selected one or more set of semi-structured records in the second format. One or more codes are directed to associating 621 at least one of the semi-structured records in the first format with a respective semi-structured record in the second format. One or more codes are directed to identifying 623 a fixed component and a variable component in each of semi-structured records in the first format and/or at least one of the semi-structured records in the first format. One or more codes are directed to determining 625 one or more patterns associated with the identified fixed component and variable component and one or more codes directed to displaying 627 at least one of the patterns. Depending upon the embodiment, other codes and methods can also exist or replace any of the above codes. That is, the functionality described herein can be provided by other forms of computer code that may be stored in one or more memories according to a specific embodiment.

The above computer codes carry out a method according to an embodiment of the present invention. As shown, the codes may include a combination of codes including a way of processing semi-structured data using selected template designs according to an embodiment of the present invention. Of course, other alternatives can also be provided where codes are added, one or more codes are removed, or one or more codes are provided in a different sequence without departing from the scope of the claims herein. Of course, one of ordinary skill in the art would recognize other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for processing semi-structured data for the support of business decisions, the method comprising:

inputting semi-structured data in a first format from a real business process;

converting the semi-structured data in a first format into a second format;

storing the semi-structured data in the second format into memory;

processing the stored information with the components of one or more business decisions to couple the business decision with the semi-structured data;

separating the semi-structured data in the second format into a fixed part, a structured data part and an unstructured data part;

identifying one or more relational class related to the business decision in the structured part;

replacing members of the relational class with special symbols to create a rewritten corpus;

determining a template from one or more aggregate patterns coupled to the identified relational class from the rewritten corpus;

displaying the relational class, the template, and the business decision; and determining from variable fields within the template, an indicator of a business event.

2. The method in 1 wherein the semi-structured data is processed together with structured data or unstructured data or both.

3. The method in 1 wherein the separation of semi-structured data is done interactively.

4. The method in 1 further comprising detecting template drift by comparing the template to a second template of the structured data part to identify changed templates, new templates, or missing templates.

5. The method in 1 wherein the structured data are extracted and stored in a relational database.

6. The method in 5 wherein the structured data are further processed by mapping them into a set of data types commonly used in relational databases.

7. The method in 5 wherein the structured data are further processed by mapping them into a set of data types provided by a user.

8. The method in 5 wherein the structured data are further processed by mapping them into a set of data types used in the business.

9. The method of claim 5 further comprising using the extracted relational data as input for text classification.

10. The method in 1 wherein the semi-structured data consist of a set of text records.

11. The method in 10 wherein the records are separated into three parts based on parsing them into tokens and identifying each token as being fixed, structured or unstructured.

12. The method in 11 wherein the parsing into tokens is based on user-supplied, commonly used or statistically inferred delimiters.

13. The method in 11 wherein the fixed data is separated based on clustering records and identifying frequent tokens in a cluster as fixed.

14. The method in 13 wherein clustering is letter n-gram clustering.

15. The method in 13 wherein the clustering algorithm used is one of k-means, Expectation-Maximization clustering or hierarchical clustering.

16. The method in 11 wherein the separation of structured and unstructured parts is based on aligning records and identifying common tokens as fixed, and identifying non-common tokens as unstructured or structured.

17. The method in 16 wherein alignment is done via dynamic programming.

18. The method in 17 wherein a pair of different aligned tokens in an alignment of two templates is converted into a wildcard character in the merged template.

19. The method in 17 wherein a pair of different aligned tokens in an alignment of two templates is converted into a special symbol that is the union of values that match either the first or the second aligned token.

20. The method in 17 wherein a pair of different aligned tokens in an alignment of two templates is converted into a regular expression that matches both the first and the second aligned token.

21. The method in 11 wherein a variable part of a record is identified as structured if it can be mapped into a typical relational database numerical format.

22. The method in 11 wherein a variable part is identified as structured if it can be mapped into a relational database field commonly used in the business.

23. The method in 11 wherein a variable part is identified as unstructured if it did not pass any of the tests for structured data.

24. The method in 11 wherein separation is done iteratively.

25. The method in 24 wherein iterative separation is guided by the user.

26. The method in 1 wherein the special symbols are chosen to represent digits and textual data is regularized by replacing each digit with this special symbol.

27. The method in 1 wherein a post processing step examines all token sequences that match a specific wild card character in a template and replace the wild card character with a regular expression that matches all matching token strings.

28. The method in 1 wherein a first set of templates is derived in a first step, all data items matching the first set of templates are removed from the collection, and template analysis is then applied to the remainder.

29. The method in 28 wherein the template induction and document deletion steps are applied in more than one iteration.

* * * * *